United States Patent [19]

Lowry

[11] Patent Number: 5,683,179
[45] Date of Patent: Nov. 4, 1997

[54] APPARATUS AND METHOD FOR THERMOLUMINESCENT QUENCH DETECTION FOR SUPERCONDUCTING DEVICES

[75] Inventor: Jerald F. Lowry, Pittsburgh, Pa.

[73] Assignee: Northrop Grumman Corporation, Los Angeles, Calif.

[21] Appl. No.: 572,978

[22] Filed: Dec. 15, 1995

[51] Int. Cl.$^6$ .............................. G01N 25/02; G01K 11/20
[52] U.S. Cl. ............................ 374/17; 374/161; 505/160
[58] Field of Search ............................... 374/17, 21, 45, 374/57, 120, 130, 131, 161, 162; 250/336.2, 337, 483.1; 361/19; 505/160

[56] References Cited

U.S. PATENT DOCUMENTS

| | | | |
|---|---|---|---|
| 4,448,547 | 5/1984 | Wickersheim | 374/131 |
| 4,873,444 | 10/1989 | Cooke et al. | 250/337 |
| 4,880,972 | 11/1989 | Brogardh et al. | 374/131 |
| 4,978,922 | 12/1990 | Mallick, Jr. et al. | 505/160 |
| 5,112,137 | 5/1992 | Wickersheim et al. | 374/131 |
| 5,213,985 | 5/1993 | Sandroff et al. | 374/131 |
| 5,430,814 | 7/1995 | McCall et al. | 385/12 |

Primary Examiner—G. Bradley Bennett
Attorney, Agent, or Firm—Walter G. Sutcliff

[57] ABSTRACT

A quench detector for determining a conductive state in an energized superconductor, including a thermoluminescent quenching sensor in thermal contact with the superconductor and producing a quenching signal corresponding to the conductive state; and a signal processor connected to the quenching sensor, the signal processor determining the conductive state, responsive to the quenching signal. Also a method for detecting a conductive state in an energized superconductor includes detecting a luminescence signal from a thermoluminescent sensor in intimate thermal contact with, and responsive to, a temperature of the energized superconductor; comparing the luminescence signal to a threshold to determine the existence of the conductive state; and responding to the conductive state with a predetermined response. The method can include activating the thermoluminescent sensor by irradiating the sensor. The conductive states include the superconductive state, the local coil quench state, the propagating normal conductive state, the growing normal conductive state, and the global quench state.

24 Claims, 8 Drawing Sheets

APPARATUS AND METHOD FOR THERMOLUMINESCENT QUENCH DETECTION FOR SUPERCONDUCTING DEVICES

BACKGROUND OF THE INVENTION

1. Field of the Invention

The invention herein relates to apparatus and methods for protecting superconducting devices, in particular, for detecting the presence of a quenching state in a superconductor and, most particularly, for detecting quenching states using thermoluminescent sensors.

2. Description of the Related Art

Presently, a significant number of large superconducting devices are under design and fabrication. Examples are Superconducting Magnetic Energy Storage (SMES) coils, and Toroidal Field (TF), Poloidal Field (PF), and Central Solenoid (CS) superconducting coils for the International Tokamak Experimental Reactor (ITER). In such superconducting devices, there can be small regions of the superconductor that, on occasion, become normal conductors during operation. That is, if the temperature in such a region exceeds the critical temperature of the superconductor ($T_c$), the strands become normal, or, resistive, conductors rather than superconductors, and a resistive power loss is generated by current passing through the cable strands. Regions vulnerable to this loss of superconductivity can include weld joints in superconducting strands, areas subject to frictional heating or excessive strain, etc.

In some devices, the design of the superconducting cable is such that any small, local, "normal" region will not grow in volume beyond a certain size, or begin to propagate along the conductor, but rather will recover to the superconducting state. Such a design is said to be cryostable, at least to some level of energy input. However, during certain events or in certain devices, such a normal region may begin to grow in volume or propagate, with ever increasing resistive power losses. Such an event is referred to as a "coil quench," and means or systems for detecting such events are described as quench detection systems. Coils of the type mentioned above can store large amounts of energy, e.g., from a few megajoules to many gigajoules. Therefore, it is very important to detect such regions quickly so that measures can be taken to protect the coil, which can include bypassing current around the coil, or dumping the energy stored in the coil to an external load.

The conventional means for detecting a normal region in a superconducting coil winding can include the use of voltage taps along the coil. These taps may be located either on the main winding or on a separate co-winding, i.e., an independent low-current winding carried in parallel with the main winding, but not carrying the primary coil current. The voltage, V, between any two taps can be described by:

$$V=IR+L(dI/dt)$$

where R is the coil resistance and L is the self-inductance between the two taps. If the coil current, I, is constant, then $V=IR$, $\Delta V=I (\Delta R)$. A change in voltage that is detected at the taps is likely due to a change in the coil resistance, which can indicate a change from superconductivity to normal conductivity. If the coil current is changing, such as during a current ramp-up or ramp-down, a voltage proportional to the changing current can appear between the taps, even when the entire coil is superconducting, i.e., R=0. If a portion of the coil quenches, i.e., R≠0, this voltage will change in accordance with the formula $$\Delta V=I(\Delta R)+R(\Delta I)+L(\Delta (dI/dt))$$

Thus, it may be difficult under many typical coil operating conditions to determine whether a voltage appearing between the voltage taps indicates an actual coil quench. The use of a bifilar co-winding tends to minimize the inductive term.

Another difficulty using voltage taps is that each tap generally is in contact with a different portion of the coil winding. When the coil is being charged or discharged, or the coil energy is dumped, large transient kilovolt-level voltages may appear across the coil winding and between the voltage taps, thus requiring substantial electrical insulation (and isolation) between the voltage taps, and for the quench detection instrumentation attached to the taps.

When it is desired for the quench detection system to physically locate the quench origin in the coil, then a large number of voltage taps must be used, generally at least one tap for each turn of the coil winding. A quench location can be deduced by timing the arrival sequence of voltage pulses from the various taps. Because the voltage at each of these taps may be different during coil charging or discharging, each one must be electrically insulated and isolated from all other taps, and from electrical ground, to avoid compromising the coil insulation system.

Yet another difficulty with voltage taps arises from the electrical noise which usually is present on the coil winding and voltage taps, even during normal DC operation. Much of this noise stems from the effects of the chopping, filtering, and regulating circuitry in the magnet power supply. Typical noise voltage levels are on the level of a few hundred millivolts, therefore, the quench voltage must reach up to 0.5 volts before it can be detected above line noise.

Other quench detecting systems using fiber optic components have been employed. For example, in U. S. Pat. No. 5,430,814 to McCall et al., a single-core optical fiber system for detecting temperature transients in superconducting magnets is described. In this system, a coherent light signal is split and directed through a single optical fiber and a reference optical fiber. Coherent light can be phase-shifted by about 90 degrees before it is input to either the reference fiber or the signal fiber. An interferometer can be used to detect the relative phase difference of the coherent light output from the signal and reference optical fibers, with a certain range of phase differences being indicative of superconductor quenching. This method and apparatus also overcomes many of the disadvantages of voltage taps, but has its own disadvantages, including the requirement for a coherent light source, for sophisticated and complex optical equipment such as beam splitters and phase shifters, and for a sophisticated and expensive detection system, for example an optical interferometer.

Another apparatus and method for quench detection, also using optical fibers, is described by O. Tsukamoto, et al., in "Detection of Temperature Rise at 4.2 K. By Using Dual-Core Optical Fiber—An Optical Method to Detect A Quench of A Superconducting Magnet," 31 Adv. Cryo. Eng., Plenum House, N.Y. (1986). Tsukamoto describes quench detection by sensing a difference in the refractive indices between the two doped cores, as the cores are subjected to the thermal effects of the developing quench. In addition to the increased cost and difficulty of incorporating a dual-core fiber into a magnet winding, the doped fibers are inherently radiation-sensitive and may be impractical in high-energy particle accelerators, tokamaks, and other radiation-producing applications.

What is needed then is an apparatus and method for quench detection in a superconductor having electrical energy stored therein or flowing therethrough which is generally compact and radiation-insensitive, and which minimizes compromise in the superconductor electrical insulation system and provides sufficient electrical insulation between the detector and the coil winding. It is desired to use the phenomenon of thermoluminescence so that the apparatus and method thus provided are inherently sensitive, simple, reliable, and inexpensive.

SUMMARY OF THE INVENTION

The invention herein provides an apparatus and method for determining the conductive state of an energized superconductor which can employ thermoluminescence to detect quenching in the superconductor. The apparatus is a quench detector that includes a thermoluminescent (TL) quenching sensor and a signal processor. The TL quenching sensor is in operable thermal contact with the superconductor and produces a quenching signal corresponding to the conductive state. The signal processor is operably connected to the quenching sensor and determines the conductive state responsive to the quenching signal.

The quenching sensor includes a preselected thermoluminescent material which generates a luminescence signal corresponding to a temperature of the superconductor, which temperature is indicative of a preselected conductive state. The signal processor can include a luminescence detector coupled to the quenching sensor, which provides a quenching signal responsive to the luminescence signal. The quench detector also can include an activating source coupled to the quenching sensor, which energizes the preselected thermoluminescent material to at least one metastable state. Depending upon the TL material employed the activating source can be a photonic activating source or an ionizing radiation activating source. Further, the quench detector can include a quench relief device coupled to the superconductor and the signal processor, which can divert electrical energy from the energized superconductor responsive to the quenching signal. The quench relief device can include an electrical bypass connected in parallel with the energized superconductor for diverting the electrical energy from the energized superconductor, responsive to the quenching signal.

The quenching signal can have a signal spectrum that corresponds to the preselected conductive state. Accordingly, the luminescence detector can include a spectral analyzer for determining a characteristic of the preselected conductive state corresponding to the signal spectrum.

The quenching sensor can include multiple sensor segments and multiple preselected thermoluminescent materials, with each of the sensor segments corresponding to a preselected thermoluminescent material. Each of the sensor segments can be spatially set apart from other sensor segments, and can be disposed in a preselected spatial relationship along the quenching sensor. A synchronizer can be coupled to selected ones of the luminescence detectors, for determining a temporal relationship between quenching signals from the sensors, thereby providing a location of the preselected conductive state in the superconductor. Therefore, the quenching sensor can be responsive to a spatial characteristic of the preselected conductive state.

The quenching sensor can include an optical sensor that has the preselected thermoluminescent material included therein. Also, the optical sensor can be an optical fiber, an optical fiber bundle, or a light pipe. In the alternative, a portion of the preselected thermoluminescent material can be in thermal contact with the superconductor, and the optical sensor can be optically coupled with the portion, for receiving the luminescence signal from the portion, and conveying the signal to the luminescence detector. The portion can be a layer of preselected thermoluminescent material disposed on a portion of the superconductor. The portion also can be a crystal of preselected thermoluminescent material, and the quenching detector can include a receptacle for enclosing the crystal therewithin. The receptacle can have a heater within, in contact with the crystal. The heater is in electrical contact with the superconductor, heating the crystal responsive to the conductive state and producing the luminescence signal thereby.

Instead of a TL crystal, a preselected thermoluminescence activation material can be intermixed with the preselected thermoluminescent material to form a thermoluminescent mixture. The mixture can be enclosed within a receptacle which is in intimate contact with the superconductor, thus permitting the signal to be coupled to the optical detector.

The preselected conductive states detected by the quench detector can include the superconductive state, the local coil quench state, the propagating normal conductive state, the growing normal conductive state, and the global coil quench state. The spatial characteristic can include quench propagation velocity, quench size, and quench location.

The method for detecting a conductive state in an energized superconductor, according to the invention herein can include detecting a luminescence signal from a thermoluminescent sensor; comparing the luminescence signal to a predetermined threshold value, corresponding to the preselected conductive state, to determine the existence of the preselected conductive state; and responding to the preselected conductive state with a predetermined response. The sensor can be in intimate thermal contact with at least a portion of the energized superconductor, and be responsive to a temperature of the superconductor, which temperature being indicative of a preselected conductive state. The method also can include the step of activating the thermoluminescent sensor by irradiating the sensor with a preselected radiation, with the sensor being responsive to the radiation. Furthermore, the method can include cooling the superconductor to a preselected superconductor operating temperature, prior to activating the TL material.

BRIEF DESCRIPTION OF THE DRAWING

FIG. 3b is a side view in cross-section of the sensor in FIG. 3a.

DESCRIPTION OF THE PREFERRED EMBODIMENTS

Figure 1:
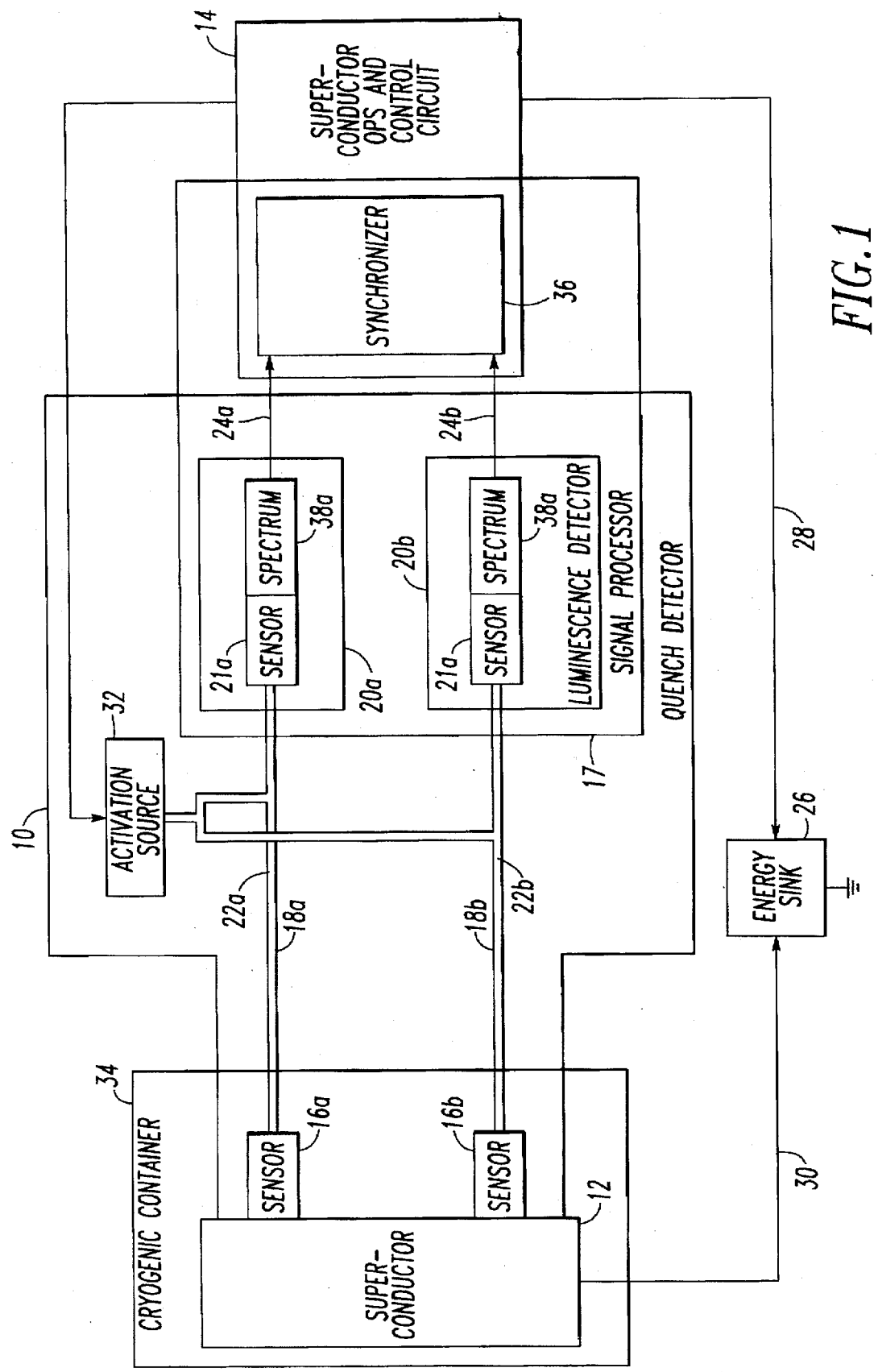
FIG. 1 is a block diagram of a thermoluminescent quench detector according to the invention herein.

In certain crystal materials, when suitably irradiated and maintained at a low temperature, a fraction of the irradiation energy can be stored in metastable energy states. Some of this energy later can be recovered as visible photons when the material is heated. This phenomenon is called thermoluminescence (TL), which is a type of thermally-activated phosphorescence. In some crystalline materials exhibiting TL, ionizing radiation can release an electron from the valence band to the conduction band, thereby leaving a hole in the valence band. The electron and hole can migrate through the crystal until they either recombine or become trapped in metastable states. These metastable states are presumed to be associated with such defects in the crystal as impurity sites. Generally, a TL photon can be emitted through two mechanisms. First, as the crystal is heated, sufficient energy may be given to the trapped electron to raise it to the conduction band. This activated electron may wander through the crystal until it recombines with a trapped hole, thus emitting a TL proton. Second, when the hole trap is less stable than the electron trap, the hole can receive sufficient energy from heating to wander through the crystal until it recombines with a trapped electron, also emitting a TL photon.

Because the two mechanisms are similar, it is convenient to consider only the first mechanism. The energy gap, $E_g$, is related to the temperature needed to release the electron, and thus produce thermoluminescence. In practice, many trapped holes and electrons can be produced. As a crystal is heated, the probability of releasing any particular electron is increased, and at some temperature its release can be virtually certain. Typically, the TL light thus emitted will start out weak, increase to a maximum level with increasing temperature, and decrease to essentially zero.

A glow curve is a graph of TL light emissions as a function of time, temperature, or both. The shape of a glow curve for a particular trap can be predicted theoretically for linear heating. Most phosphors contain a number of traps and, thus, a glow curve may consist of a number of glow peaks. If the energy differences between the glow peaks are too small, or if the heating of the phosphor is too rapid, not all glow peaks may be resolved. If $E_g$ is very small, the trap may be unstable at room temperature (about 25° C.), and can only be observed by keeping the crystal cold during irradiation. If $E_g$ is less than about 0.8 eV, many electrons can be released at room temperature and common phosphorescence occurs. Therefore, TL can be thought of as a "frozen-in" phosphorescence that is released upon heating. Other phenomenon related to TL can include the production of trapped electrons by light, usually ultraviolet light, and the release of trapped electrons by light. Stimulated luminescence, i.e., the release of electrons by infrared light to produce luminescence, can be used, in addition to the aforementioned mechanisms, for effecting thermoluminescent dosimetry (TLD), that is, the measurement of photons released through thermoluminescence.

Many materials are known to be thermoluminescent, including alkaline halides, silver halides, $CaF_2$, SrS, ZnS, ZnSe, ZnO, MgO, $Zn_2SiO_4$, $CaWO_4$, $CaCO_3$, $SiO_2$, $Al_2O_3$, BN, $TiO_2$, $SrTiO_3$, $CaNb_2O_6$, diamond, organic materials, and inorganic crystals containing rare-earth ions. Although many of the TL effects of these materials have been investigated at temperatures near and above room temperature, some materials have been studied at temperatures near that of liquid nitrogen (78 K.). However, many examples of TL behavior at temperatures below 20 K. have been demonstrated.

The apparatus and method described herein provides a detection system which is basically optical in nature, thus providing substantial electrical isolation between the detector and the coil winding. Quench detection according to the invention herein can be either "local" or "global" and quench detection capabilities can locate the existence of a normal zone to within a few centimeters and can detect traveling normal zones, distinguishing between a traveling normal zone and a growing normal zone. Thus an embodiment according to the invention herein can detect at least the following conductive states: superconductive state, local quench state, propagating normal conductive state, growing normal conductive state, and global quench state.

In addition, the embodiments according to the invention herein tend to produce reduced amounts of noise yet are inherently sensitive, simple, reliable, and inexpensive, compared to other quench detection devices. Also, the apparatus can be configured to measure quench propagation velocities (QPV). By the choice of an appropriate TL material, the embodiments herein may be readily adaptable to new high temperature superconductors. Indeed, many of the materials comprising the high temperature superconductors are intrinsically thermoluminescent. System sensitivity to small changes in superconductor temperature also can be varied by the choice of TL material, optical fiber dopant, or optical detector threshold. Because many materials can be TL materials and many different types of superconducting wires, cables, and coil winding systems exist, superconductor quench detection and coil protection systems using thermoluminescence can be implemented in numerous embodiments; thus it will be understood that the invention herein is not limited to the embodiments disclosed hereafter.

In general, an apparatus for detecting the conductive state in an energized superconductor can include a quenching sensor and a signal processor. As used herein, an energized superconductor is one having electrical energy stored therein or flowing therethrough. The quenching sensor includes a preselected thermoluminescent material which is in operable thermal contact with the superconductor. The preselected TL material provides a luminescence signal corresponding to a temperature of the superconductor. The signal processor can include a luminescence detector. The luminescence detector provides a quenching signal responsive to the luminescence signal which is received from the quenching sensor. By placing a suitable thermoluminescent material into intimate thermal contact with the superconductor, the temperature thus sensed can be indicative of a predetermined conductive state which can include: the superconductive state, a local coil quench state, a propagating normal conductive state, a growing normal conductive state, and a global quench state. The first two states can be detected by a single TL quench detector, whereas the last three states may require at least two TL quench detectors at different locations on the superconductor. The apparatus also can include an activation source which is coupled to the quenching sensor and which energizes the thermoluminescent material to a metastable state thereby effecting the luminescence signal provided by the thermoluminescent material. It is preferred that, after the superconducting device has been cooled to its operating temperature and before the device is energized, the TL material is activated by the activation source. The source can provide the desired amount and type of radiation such as, for example, UV, VUV, or visible radiation, depending upon the nature and characteristics of the particular TL material. Where required by the application, the source can be chosen to provide energetic electrons, X-rays, or some other source of energetic ionizing radiation. This activation can be used to effect the response of the TL material to thermal conditions.

Activation energy using UV or visible radiation may be effected through an optical medium such as an optical fiber, optical fiber bundle, or a light pipe. The optical medium is used to direct the activation energy to the TL material from a UV or visible radiation source, which can be external to the coil and the cryogenic containment vessel. Where the activation energy is provided by energetic electrons, X-rays, or other ionizing radiation, the radiation source, such as a small quantity of a suitable radioisotope, can be placed in close proximity to the TL material.

Following the activation of the TL material, the superconducting device can be energized and placed into operation according to its purpose. If a quench occurs at some location in a winding of the superconductor device, the TL material in contact with the superconductor at that location will be heated, and those electrons in metastable states will be elevated to the conduction band. These electrons are free to wander through the material until they encounter trapped holes, and then can recombine to release photons, generally, visible radiation. Similarly, holes can be sufficiently energized to wander through the material until they encounter trapped electrons, where they may recombine to release visible radiation.

FIG. 1 illustrates one embodiment of the apparatus according to the invention herein. Quench detector 10 is operably coupled to superconductor 12 and provides quench signals 24a, b to superconductor operations and control circuit 14. Responsive to signals 24a, b, circuit 14 can actuate energy sink 26, causing superconductor 12 to rapidly dump energy stored therein through energy sink conductor 30 to sink 26. Detector 10 can include quenching sensors 16a, b which are in operable thermal contact with superconductor 12, and signal processor 17, which is operably connected to quenching sensors 16a, b. Quenching sensors 16a, b can include a preselected TL material which provides luminescent signal 22a, b responsive to the temperature of superconductor 12. Signal processor 17 can include a luminescence detector 20a, b which receives signal 22a, b from sensor 16a, b and provides signal 24a, b responsive thereto. Energy sink 26 can be a superconductor bypass circuit or an external resistor to which is dumped the energy stored in, or flowing through, superconductor 12. Energy dumping can be effected by signal processor 17, control circuit 14, or both.

Luminescence detectors 20a, b can include an optical medium 18a, b and a luminescence sensor 21a, b. The luminescence signal 22a, b provided by sensor 16a, b can be directed to luminescence sensor 21a, by way of optical medium 18a, b. Medium 18a, b can consist of an optical fiber, fiber bundle, or some type of light pipe. Sensor 21a, b can be a sensitive luminescence detector such as a silicon photodetector or a photomultiplier tube (PMT). One example of a suitable photodetector is the Model 71901 Silicon Photovoltaic Detector manufactured by Oriel Corporation, Stratford, Connecticut. Other similar suitable photovoltaic detectors are manufactured by EG&G Vactec, St. Louis, Mo., and Newport Corporation, Irvine, Calif. An example of a PMT detector is the Model 77348 PMT manufactured by Oriel Corporation, Stratford, Conn. Other similar suitable PMT detectors are manufactured by Hamamatsu Corporation, Bridgewater, N.J., and Phillips Photonics, Slatersville, R.I. Both the silicon photovoltaic and PMT detectors may require auxiliary equipment in order to generate the required signals.

Activating source 32 can be coupled to quenching sensor 16 via medium 18a, b. In general, source 32, sink 26, and sensor 21a, b can be located outside of the cryogenic containment vessel 34 surrounding superconductor 12. In some embodiments of the invention herein a single optical medium may be used to both convey activation energy to the TL material in sensor 16a, b and receive the luminescence signal 22a, b from sensor 16a, b.

Where optical medium 18a, b is cabled with superconductor 12, both medium ends may be brought out of vessel 34, with each end having a respective sensor 21a, b, so that the spatial origin of TL glow can be determined. Sensor 16a, b can be disposed in a preselected spatial relationship relative to superconductor 12. Where multiple luminescence detectors 20a, b are used, synchronizer 36 can determine the temporal relationship between quenching signals 22a, b, thus providing the location of a predetermined conductive state in superconductor 12. Synchronizer 36 can be part of signal processor 17. In general, TL materials do not have a single glow peak, but rather an entire series of peaks, or emissions, at different temperatures, with the wavelength or spectrum of the emission varying with the material temperature. Spectral analyzers 38a, b, can process emissions spectra so that detectors 20a, b provide circuit 14 with the signal spectrum magnitude, and arrival time of quenching signal 22a, b. This data is provided to circuit 14 for determination of the existence and characteristics of a preselected conductive state.

For example, it is possible to determine whether the normal zone is growing in size, e.g., involving a greater proportion of the winding, or propagating away from the point of origin, with the conductor recovering to its superconducting state behind the propagating normal zones. The latter state is desirable because a growing normal zone may require an immediate coil energy dump. On the other hand, a propagating normal zone may not require an immediate response but, rather, continued observation to determine whether the propagating zone stops when it reaches a "quench stopper." A quench stopper is a heavily stabilized region of the conductor specifically designed to absorb heat and to stop propagating or growing quenches.

A growing normal zone can result in an ever-increasing conductor temperature at the center of the zone, with subsequent releases of TL emissions being in additional spectral bands and at changing wavelengths. On the other hand, a propagating normal zone may result in an increase in conductor temperature to some value above critical temperature, $T_c$, at a particular point along the conductor, followed by recovery of the temperature to a value below $T_c$. Thus, TL emission from a propagating normal zone can be restricted to a certain band or wavelength region characteristic of a relatively small increase in temperature.

Because growing and propagating normal zones have differing spectroscopic "signatures" such zones can be readily identifiable. As used herein, a global quench detector is one designed to detect a quench anywhere in a superconductor coil winding, wherever it occurs. On the other hand, a local quench detector is one designed to detect quenches in some localized region of the coil winding, for example, at a particular location along the superconductor where local thermomechanical conditions may be likely to cause a quench.

An embodiment of quench detector 10 according to the invention herein can provide for the measurement of quench propagation velocities (QPV). If a particular embodiment of quench detector 10 is functioning as a local quench detector, then the measurement of the QPV is a matter of determining where the detectors are located and the arrival time of the quench at each local detector. However, a global quench detector also may be used to measure QPV. In such an embodiment, sensors 16a, b can have differing TL characteristics, thus creating marker regions. As a quench grows or passes by the marker regions, the characteristics of the TL emission will change. By timing such emission changes in the context of the known spatial position of sensors 16a, b, the QPV can be derived.

Although FIG. 1 illustrates sensors 16a, b as being separate from optical medium 18a, b, optical medium 18a, b can be selected to incorporate desired thermoluminescent properties therein. For example, thermoluminescence can be demonstrated by both natural and synthetic quartz fibers. Also, other materials including $CaF_2$ and ZnSe and certain selected organic materials such as, for example, ultra high molecular weight polyethylene can exhibit thermoluminescence.

Figure 2:
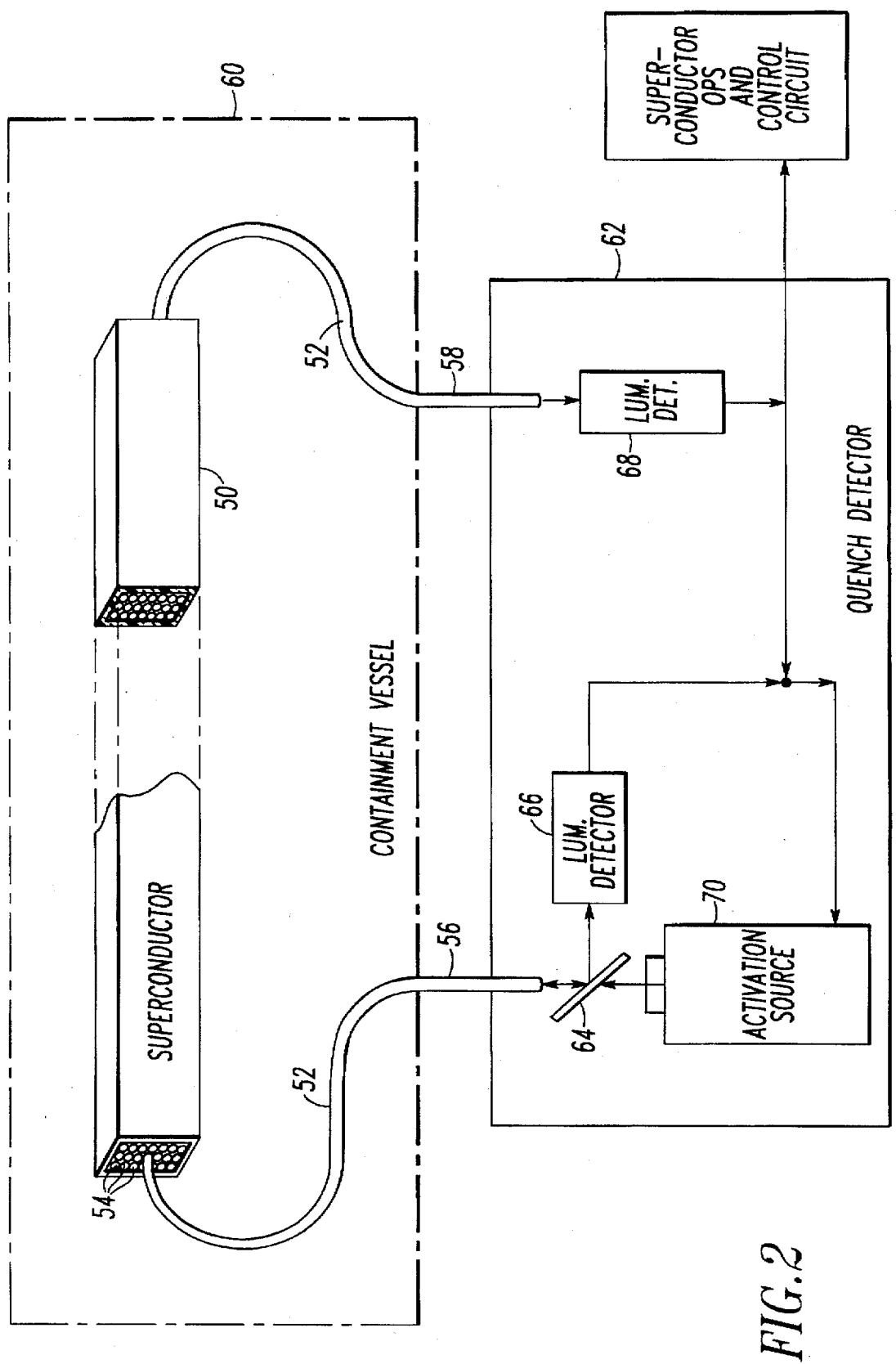
FIG. 2 is a block diagram of one embodiment of a thermoluminescent quench detector.

FIG. 2 illustrates an embodiment of the invention herein using use the TL properties of quartz fibers. Although quartz is a commonly-used optical fiber material, quartz that is annealed at 900° C. can produce TL glow peaks at liquid nitrogen temperatures, e.g., 78 K., using UV radiation for activation energy. TL glow can occur when the quartz fiber is heated to about 90° K. By changing the impurity constituents or concentrations, the temperature at which TL glow occurs can vary. In FIG. 2, superconductor 50 includes a multi-stranded cable conductor. Thermoluminescent optical quartz fiber 52 can be placed into intimate thermal contact with superconductor 50 by entwining fiber 52 among strands 54 of conductor 50. In the alternative, fiber 52 can be introduced into superconductor 50 in such a way that fiber 50 remains substantially near the center of conductor 50 with strands 54 being cabled around quartz fiber 52. In a heavily-stabilized conductor, such as the SMES conductor, the stabilizer could be extruded with a small groove for the optical fibers(s). Alternatively, to protect the somewhat fragile fiber, fiber 52 could be placed in a metallic sheath, and the sheath assembly could be cabled into conductor 50, or soldered or otherwise attached to the stabilizer. One or both ends of fiber 52 may be separated from superconductor 50, and brought out of containment system 60 to a room-temperature quench detector 62 consisting of, for example, beam splitter 64, luminescence detectors 66, 68, and activation source 70.

In the embodiment shown in FIG. 2, activation source 70 can produce energizing photons in a preselected wavelength range such as, for example, 1000 Å to 4000 Å in an ultraviolet or visible radiation range. Source 70 can be an arc lamp, flash lamp, laser, or another source that can provide sufficiently intense radiation. After superconductor 50 has been cooled to cryogenic temperatures, source 70 can activate the TL fiber material to create electron-hole pairs in metastable states or traps. Detectors 66, 68 can sense the thermoluminescence emitted when some portion of the semiconductor heats, i.e., normalizes, during a quench. Source 70 and detector 68 also can be used to determine the continuity of the optical fiber by transmitting photons into end 56 and measuring the emissions received at end 58. The embodiment shown in FIG. 2 also can determine the physical location of the quench origin by measuring the arrival times of the TL optical pulses received at ends 56, 58 of fiber 52. Such timing can thus be performed with sub-nanosecond accuracy, and the quench origin can be located to within several centimeters, or less, if desired. In addition to TL optical quartz, fiber 52 can be fabricated from any suitable transparent or semi-transparent TL material, including $CaF_2$, ZnSe, and organic material that can have low optical attenuation.

Figure 3A:
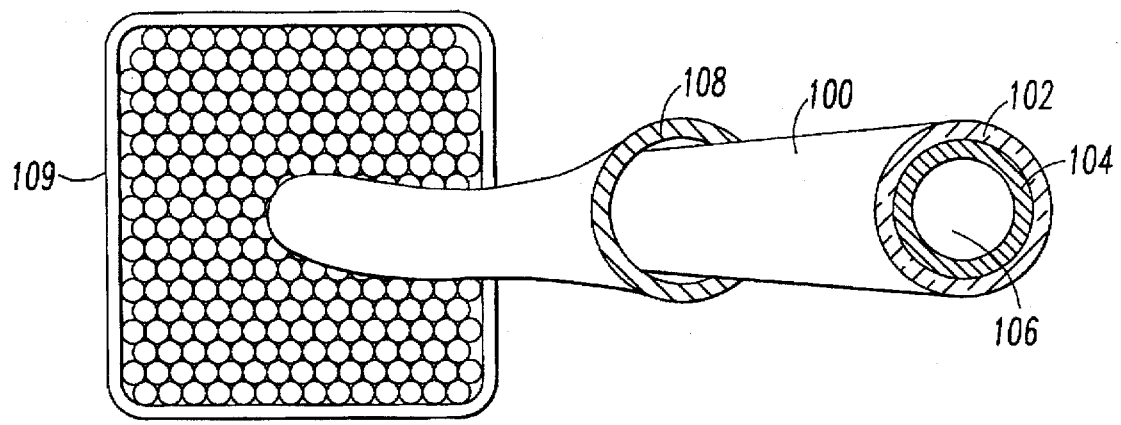
FIG. 3a is an illustration of one embodiment of a thermoluminescent sensor using a light pipe.

In place of TL quartz fiber 52 in FIG. 2, a hollow, tubular light pipe 100, seen in FIG. 3A, can be used. Light pipe 100 can be composed of suitable tubing material that can convey light along wall 102, and is compatible with the cryogenic methods and substances used in the particular application. Such tubing material can include hollow, capillary-like, quartz, glass, metallic, or plastic tubing. At least a portion of light pipe 100 can contain a thin layer of preselected TL material 104 which can be a layer of TL gas, liquid, or solid material at room temperature. The hollow channel 106 in the center of pipe 100 can then be evacuated before placing the device into operation. Light pipe 100 can be shielded in a protective metal sheath 108, if required. Pipe 100 can be placed into intimate thermal contact with superconductor 109 by entwining pipe 100 among strands 107 of superconductor 109. In the alternative, pipe 100 can be introduced into superconductor 109 in such a way that light pipe 100 remains substantially near the center of conductor 109 with strands 107 being cabled around light pipe 100.

Figure 3B:
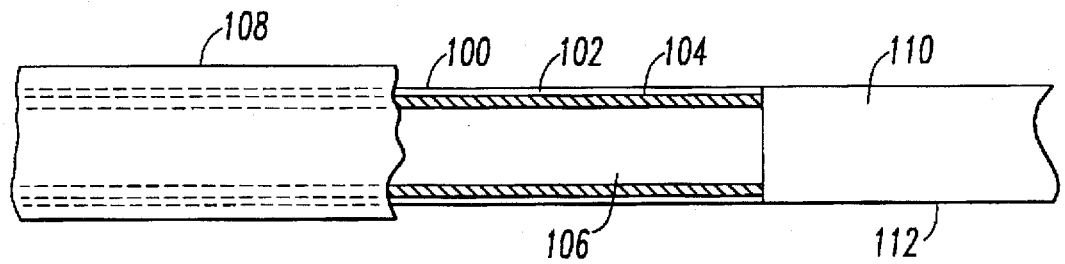

Both ends of light pipe 100 can be sealed to optical fiber 110, as shown in FIG. 3B. Fiber 110 can be a quartz, glass, or plastic optical fiber. In this case, TL material 104 can be added by substantially replacing air entrapped within pipe 100 with a TL gas mixture prior to joining pipe 100 to fiber 110. Alternatively, a liquid slurry containing solid TL material can be used. As indicated above, the embodiment seen in FIGS. 3A and 3B can replace fiber 52 in FIG. 2. Accordingly, fiber end 112 in FIG. 3B s suitable for coupling with beam splitter 64, luminescence detectors 66, 68 and activation source 70, seen in FIG. 2.

Suitable TL gas mixtures can include simple molecules suspended in an inert gas matrix and maintained at a low temperature, e.g. 4–5 K. The aforementioned simple molecules can include $N_2O$, CO, $CO_2$, and $SO_2$, and a suitable inert gas can be, for example, Ar. With such mixtures, activation energy can be provided by, for example, a xenon resonance lamp emitting photons with a wavelength of about 147 nm. Self-activating TL mixtures, such as a nitrogen/tritium mixture, can be introduced into light pipe 100 as TL mixture 104. In this particular embodiment, light pipe 100 can be placed into intimate thermal contact for a substantial portion of the superconductor 109, and can be used as a global quench detector. Self-activating mixtures are discussed to a greater extent in the context of FIG. 8, below.

Also, when light pipe 100 is composed of a hydrogen-containing material, such as a polymer, tritium can replace an operable portion of the protium, or hydrogen-1 ($^1H$), atoms normally found in the polymer structure. In this case, light pipe 100 could be filled with only a TL material, such as nitrogen. In addition, light pipe 100 could be composed of a solid material that has self-activating TL materials, such as both tritium and nitrogen, incorporated therein. Furthermore, in place of tritium, another activation material, such as nickel-63, can be incorporated into the material forming light pipe 100. The use of nickel-63 is further discussed in the context of FIG. 8.

Figure 4A:
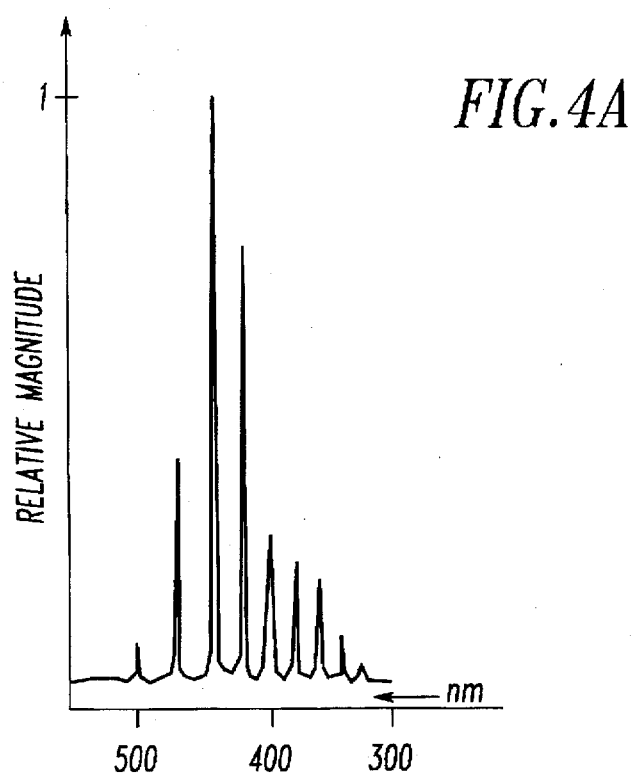
FIG. 4a is a graph of the thermoluminescent emission spectrum of solid $N_2O$ suspended in a solid Ar matrix as a function of emission wavelength.
Figure 4B:
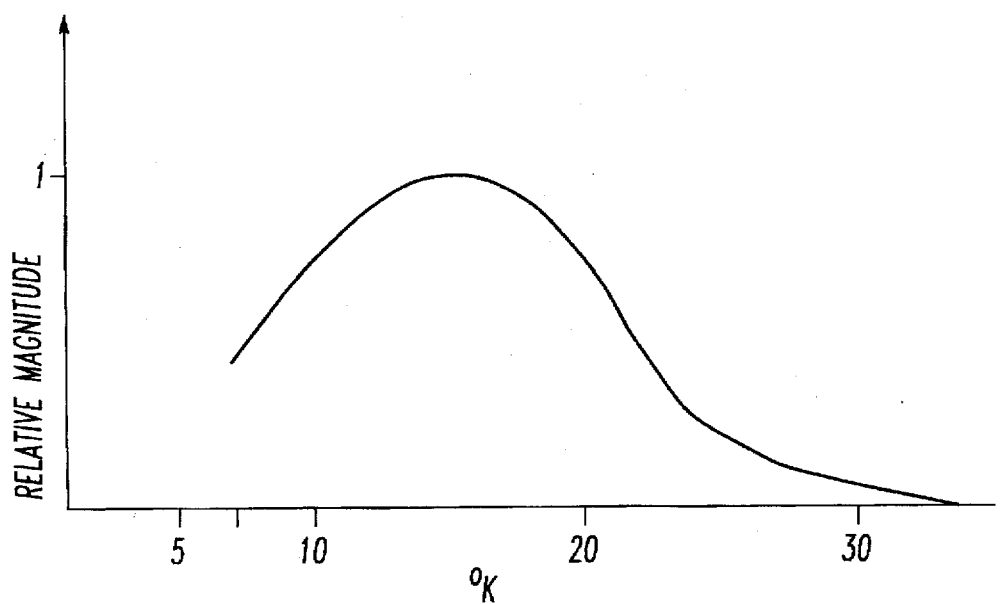
FIG. 4b is a graph of the relative intensity of the thermoluminescent emission of solid $N_2O$ suspended in a solid Ar matrix as a function of temperature.

FIG. 4a illustrates that the TL emission of solid $N_2O$, suspended in a solid argon matrix and activated by a xenon resonance lamp with 147 nm emissions, is not a continuum. Instead, it is a line spectrum in the 300–500 nm wavelength UV and visible light bands. When the $N_2O/Ar$ mixture is warmed, a glow curve can be generated, as seen in FIG. 4b. The glow curve intensity attains a peak value at around 15 K. and decreases to nearly zero by about 35 K.

Figure 5:
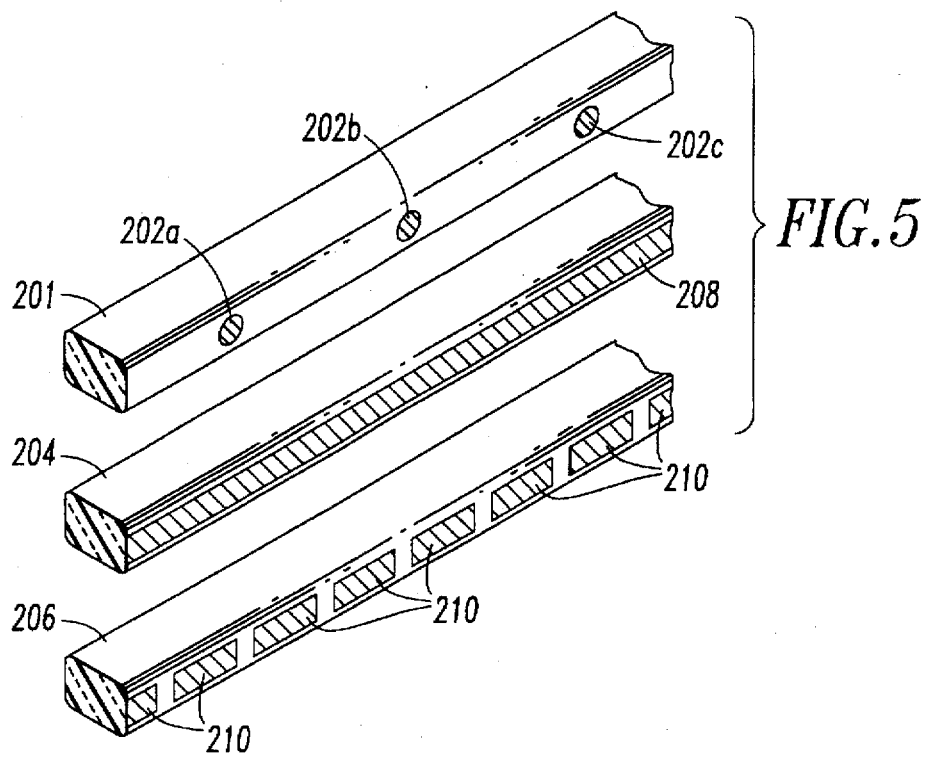
FIG. 5 is an illustration of certain embodiments of thermoluminescent sensors as thin adherent layers.
Figure 6A:
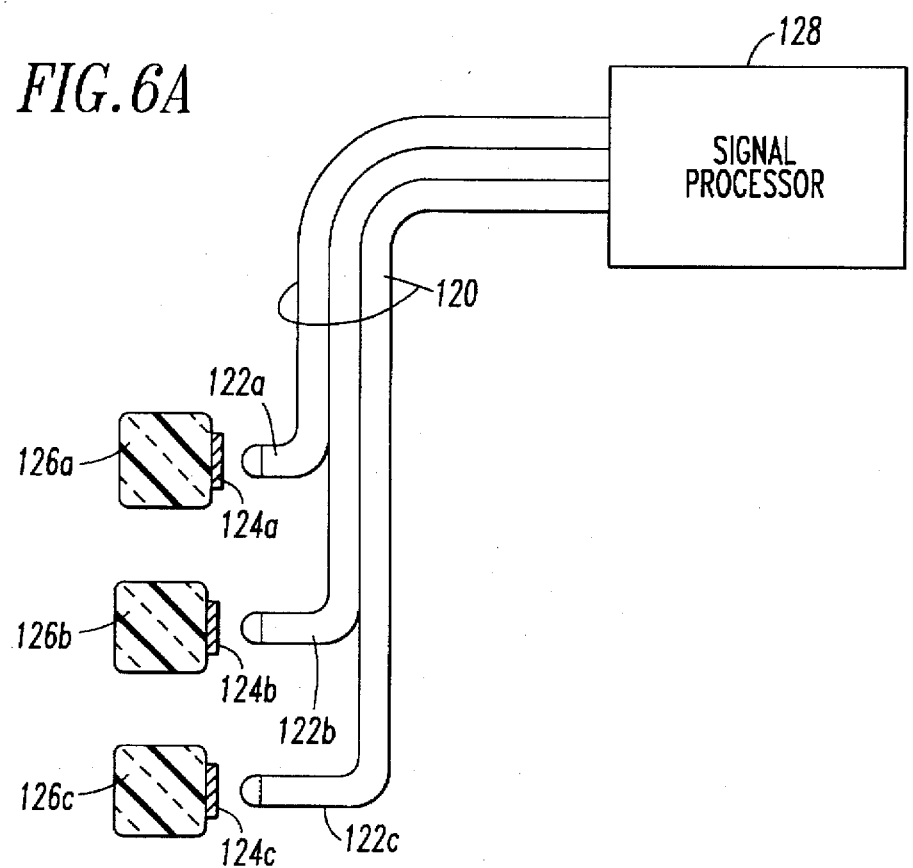
FIG. 6a is one embodiment of a fiber optic bundle as an optical medium to convey luminescence signals from multiple sensors.

As illustrated in FIG. 5, thermoluminescent material can be applied to selected portions of the superconductor, as a thin, adherent layer in the form of a paint, cement, or epoxy containing TL crystals. The thin, adherent layer can be substantially conformal to at least a portion of the superconductor surface, such as a TL coating. Examples of TL coating materials include ZnS doped with Ag or Cu; CaF (doped or undoped); and KCl doped with Th. In FIG. 5, superconductor 201 includes discrete regions, or spots, 202a, b, c of TL material. On the other hand, superconductors 204, 206 each have a thin stripe 208, 210, respectively, of TL material disposed on at least one side of superconductors 204, 206. The stripes can be continuous, as in stripe 208 on conductor 204, or discontinuous, as in stripes 210 on conductor 206. Although spots and stripes are shown in FIG. 5, any adherent, conformal thin-layer configuration that is consistent with the purposes of the application can be Where thin, adherent layers and other discrete placements of TL material are used, an optical medium, including one or more optical fibers or light pipes, can convey to the luminescence detector the quenching signal generated by the TL material. FIG. 6A shows optical fiber bundle 120 having each of three optical fibers 122a, b, c, associated with a respective TL-coated regions 124a, b, c that are disposed on particular superconductor surfaces 126a, b, c. Spatial and temporal information regarding the conductive states relative to surfaces 126a, b, c can be determined by transmitting to signal processor 128 for analysis the thermoluminescent emissions from respective TL regions 124a, b, c. Signal processor 128 can include quench detector components such as luminescence detectors 20a, b, and superconductor control circuit 14 in FIG. 1.

Figure 6B:
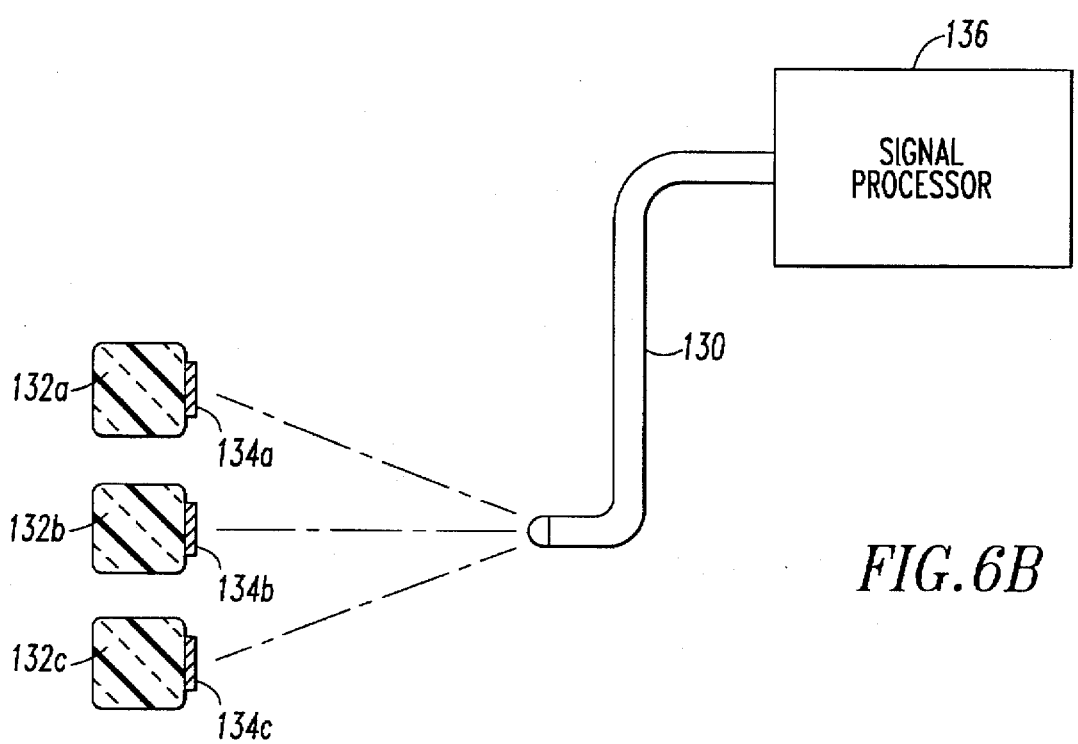
FIG. 6b is one embodiment of an optical fiber as an optical medium to convey luminescence signals from multiple sensors.

Also, a single optical fiber can be used to monitor several superconductor cables. As seen in FIG. 6B, optical medium 130, which can be a single optical fiber or light pipe, is positioned proximately to superconductors 132a, b, c, each having a respective thin adherent TL layer 134a, b, c. TL emissions from one or all of layers 134a, b, c can be sensed by medium 130 and conveyed to signal processor 136. Signal processor 136 can include quench detector components such as luminescence detectors 20a, b, and superconductor control circuit 14 in FIG. 1. In the embodiment contemplated in FIG. 6b, an imaging system can be incorporated into signal processor 136 such that multiple superconductor windings can individually be imaged by a single optical fiber. In this way, using well-known scanning techniques, a single detector or linear detector array can image multiple windings. Similarly, a single activation source could activate a large number of TL-coated areas.

In general, after the coil containing the TL-coated conductor has been cooled to the preselected operating temperature, an activation source can irradiate the TL material, for example, spots 202a, b, c, or stripes 208, 210 in FIG. 5, or coatings 124a, b, c or 134a, b, c in FIGS. 6a and 6b, respectively, through the optical medium. The radiation source can be a laser, arc lamp, flash lamp, high intensity light source, and the like, that produces the desired activating radiation, e.g., UV or visible light. This irradiation will cause a certain population of metastable hole and electron energy states, as described above. Typically, these energy states will decay at a certain decay rate, depending on the temperature, with lower temperatures producing longer decay time constants.

The TL material can be periodically "pulsed" with activation energy, depending upon the decay rate, to maintain a desired density of metastable energy states. When the source is not refreshing the TL material through the optical medium, the luminescence detectors can be monitoring the TL emissions being transmitted through the optical medium. When a quench occurs in a portion of the superconductor, the affected portion will increase in temperature. The TL materials in the thin adherent layer, in turn, produce TL emissions in the form of a glow curve that is characteristic of the TL material used. When the TL emissions indicate the emergence of a quench, measures can be taken to protect the superconductor coil. Thin, adherent layers can be located and monitored such that the quench location can be identified and the QPV measured.

Figure 7:
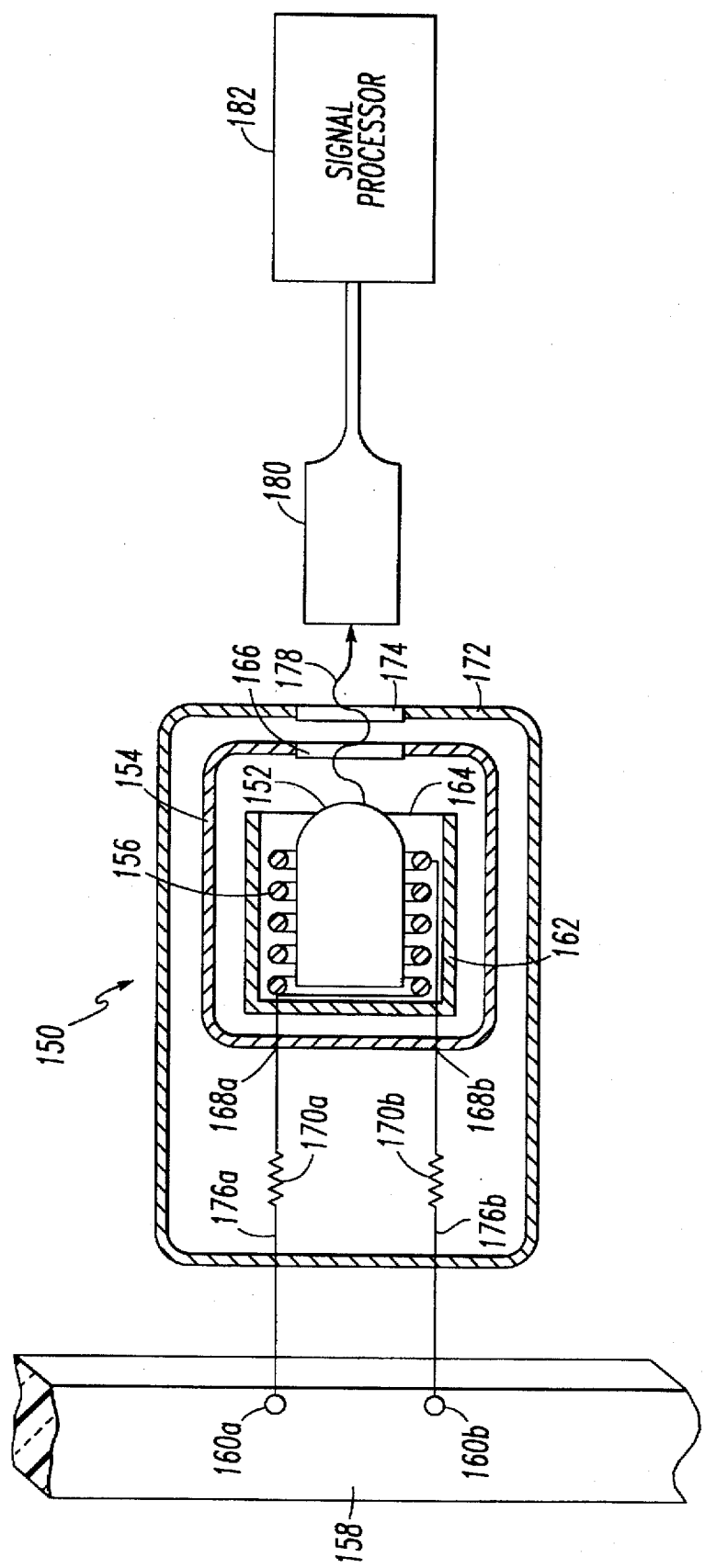
FIG. 7 is another embodiment of a thermoluminescent quenching sensor.

In certain circumstances, it may be desirable to make use of voltage taps to produce the luminescence signal. For example, it may be possible to retrofit a conventional quench detector having voltage taps with an optical detector to gain the additional electrical isolation that usually is associated with optical systems. FIG. 7 illustrates quenching sensor 150 that is intended to be used with a voltage tap. Sensor 150 can have a small TL crystal 152 hermetically sealed in an inner, preferably metal envelope 154. Surrounding crystal 152 is heater coil 156, which receives electrical energy from a potential difference in superconductor 158 between voltage taps 160a, b. Crystal 152 and heater coil 156 can be at least partially enclosed by radiation shield 162, with end 164 being left open to permit the release of photon stream 178 from crystal 152 to optical medium 180. The radiation shield 162 can direct the radiant thermal energy of the heater coil 156 to the TL crystal 152, thus increasing the sensitivity of the detector to small potential differences.

Inner envelope 154 can have substantially optically-transparent window 166 hermetically sealed thereto, proximate to open end 164, and hermetic electrical feedthrough connections 168a, b, on the other end for attachment to taps 160a, b. To prevent the destruction of sensor 150 by large quench-induced voltages, current-limiting resistors 170a, b can be interposed between superconductor 158 and heater coil 156. Resistors 170a, b can be non-linear resistors which additionally can introduce thermal impedance to limit heat flow out of envelope 172.

For additional protection of the components of sensor 150, an outer envelope 172, preferably metal, can hermetically surround inner envelope 154. Similar to inner envelope 154, outer envelope 172 can have a substantially optically-transparent window 174 hermetically sealed thereto, proximate to crystal 152 and window 166 to permit photon stream 178 to pass through to optical medium 180. Similar to embodiments, such as in FIG. 1, crystal 152 can receive activation energy through optical medium 180. During a quench, heater coil 156 warms to a temperature corresponding to the voltage generated between taps 160a, b, for example, between 50–100 mV or more. In response, heated TL crystal 152 produces photon stream 178 which is conveyed by optical medium 180 to signal processor 182. Signal processor 182 can be similar to signal processors 128 and 136 in FIGS. 6a and 6b, respectively.

Figure 8:
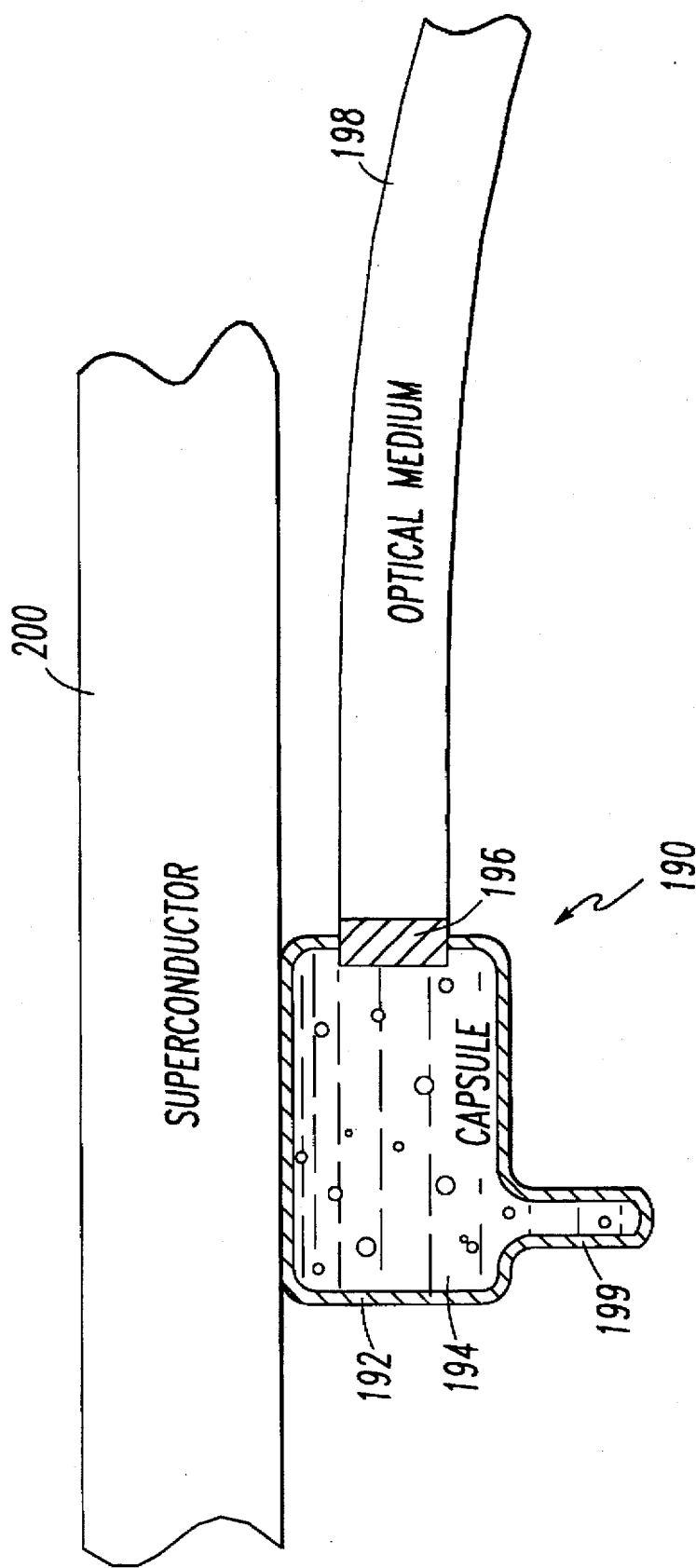
FIG. 8 is yet another embodiment of a thermoluminescent quenching sensor.

FIG. 8 illustrates another embodiment of a quenching sensor. Sensor 190 can contain a mixture of TL material and an activation source material. For example, solid nitrogen is known to be thermoluminescent after bombardment by energetic electrons at about 4.2 K. Also, tritium ($^3H$) is known to be a low-energy (5–18 keV) beta emitter with a half-life of about 12.5 years. Tritium, when mixed with solid nitrogen, can produce sufficient low-energy beta radiation to activate solid nitrogen at abut 4.2 K. The beta radiation can be easily contained by a layer of metal, e.g., the sensor housing, so that there is little or no external radiation. Other low-energy beta sources can be used in place of the tritium, such as nickel-63 ($^{63}N$) which has a half-life of about 85 years and emits beta particles with a peak energy of abut 67 keV. The nickel-63 can be introduced into capsule 192 as a small piece of foil, or as nickel "wool." The beta radiation can be contained by fabricating the capsule 192 from metal of adequate thickness.

Quenching sensor 190 can contain a self-activated TL mixture such as the aforementioned solid nitrogen/tritium mixture. Sensor 190 can include a small, preferably metal, capsule 192 that contains the TL mixture 194 therewithin. Capsule 192 can have a substantially optically-transparent window 196 hermetically sealed in one end of capsule 192. Optical medium 198 can be optically coupled to window 196, so that TL emissions generated by TL material can be transmitted through optical medium 198 for processing.

Through a small tip-off 199, also preferably metal, capsule 192 can first be evacuated and then back-filled with nitrogen/tritium TL mixture 194. The percentage of tritium in the nitrogen/tritium mixture can be minimized. For example, 1% tritium can provide adequate activation of the nitrogen. The minimum acceptable percentage tritium depends on the sensitivity of the luminescence sensor, and can be as low as 0.001%. Tip-off 199 can be spot-welded shut to hermetically seal capsule 192. Capsule 192 is placed in intimate thermal contact with superconductor 200, and, for example, can be soldered directly to superconductor 200.

As sensor 190 is cooled, the nitrogen within capsule 192 will liquefy at about 77.4° K., and condense on the walls of capsule 192 as a solid "frost" at about 63.3° K. Similarly, the tritium will liquefy at about 24.9° K. and solidify between about 14.0°–17.0° K., condensing on the walls of capsule over the now-solid nitrogen. As the temperature of the sensor is lowered, energetic electrons from the tritium will activate metastable states in the nitrogen, but the nitrogen generally will remain TL-quiescent, so long as the temperature of superconductor 200 remains at or below 4.2 K. In the event of a quench, the superconductor 200 heats, and visible TL emissions will be released at a temperature between about 9–10 K., which are sensed through optical medium 198. Glow peaks can also occur at about 14.5 K. and about 19 K.

Figure 9:
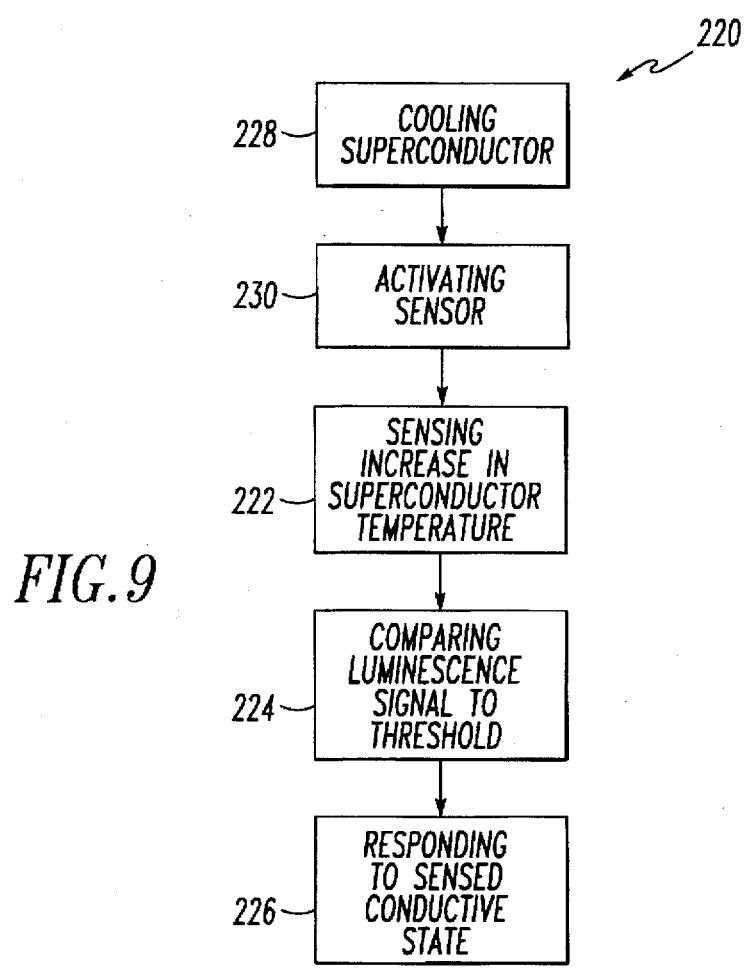
FIG. 9 is a flow diagram of the method for detecting quenching in a superconductor using a thermoluminescent sensor.

FIG. 9 illustrates a method 220 for detecting a quench in a superconductor employing a thermoluminescent quench detector. In general, the method includes sensing, step 222, an increase in temperature of the superconductor by detecting a luminescence signal from a thermoluminescent sensor which is in intimate thermal contact with the superconductor. The luminescence signal corresponds to the superconductor temperature which indicates the conductive state of the superconductor. Multiple conductive states can exist, and each state can correspond with a preselected threshold value. The conductive state can be determined by comparing, step 224, the luminescence signal to the predetermined threshold value corresponding to the particular conductive state. The method continues by responding, step 226, to the particular conductive state that is determined to exist, with a predetermined response. Such response can include providing audible and visual alarms and warnings, additionally monitoring the current conductive state of the superconductor, dumping energy which may be stored in the superconductor coils, and the like.

The method also can include activating, step 230, the thermoluminescent sensor which can be effected by irradiating the sensor with a preselected radiation to which the sensor is responsive. Prior to activating the sensor, the sensor function can be enhanced by cooling, step 228, the superconductor to a preselected superconductor operating temperature. This cooling typically precedes energizing the superconductor coils.

While specific embodiments of practicing the invention have been described in detail, it will be appreciated by those skilled in the art that various modifications and alternatives to those details could be developed in light of the overall teachings of the disclosure. Accordingly, the particular arrangements and methods disclosed are meant to be illustrative only and not limiting to the scope of the invention which is to be given the full breadth of the following claims, and any and all embodiments thereof.

I claim:

1. A quench detector used to determine a conductive state in an energized superconductor, said quench detector comprising:

a. a thermoluminescent quenching sensor, said sensor being in operable thermal contact with said superconductor and producing a quenching signal corresponding to said conductive state; and b. a signal processor operably connected to said quenching sensor, said signal processor determining said conductive state responsive to said quenching signal.

2. The quench detector of claim 1 wherein:

a. said quenching sensor includes a preselected thermoluminescent material, said preselected thermoluminescent material providing a quenching signal corresponding to a temperature of said superconductor, said temperature being indicative of a preselected conductive state; and b. said signal processor further comprises a luminescence detector operably coupled to said quenching sensor, said luminescence detector providing a luminescence signal responsive to said quenching signal.

3. The quench detector of claim 1 further comprising an activating source operably coupled to said quenching sensor, said activating source energizing said preselected thermoluminescent material to at least one metastable state.

4. The quench detector of claim 1 further comprising a quench relief device operably coupled to said superconductor and said signal processor, said quench relief device diverting electrical energy from said energized superconductor responsive to said quenching signal.

5. The quench detector of claim 4 wherein said quench relief device includes an electrical bypass connected in parallel with said energized superconductor for diverting said electrical energy from said energized superconductor, responsive to said quenching signal.

6. The quench detector of claim 2 wherein said quenching signal has a signal spectrum corresponding to said superconductor temperature which temperature corresponds to said preselected conductive state and said luminescence detector includes a spectral analyzer for determining a characteristic of said preselected conductive state corresponding to said signal spectrum.

7. The quench detector of claim 1 wherein said quenching sensor further comprises a plurality of sensor segments and a plurality of preselected thermoluminescent materials, each of said plurality of sensor segments corresponding to a respective one of said preselected thermoluminescent materials, each of said sensor segments being spatially set apart from others of said plurality of sensor segments, each of said preselected thermoluminescent materials having a predetermined thermoluminescent characteristic, said quenching sensor being responsive to a spatial characteristic of said preselected conductive state.

8. The quench detector of claim 2 wherein said quenching sensor further comprises a plurality of sensor segments and a plurality of preselected thermoluminescent materials, each of said plurality of sensor segments corresponding to a respective one of said preselected thermoluminescent materials, each of said sensor segments being spatially set apart from others of said plurality of sensor segments, each of said preselected thermoluminescent materials having a predetermined thermoluminescent characteristic, said quenching sensor being responsive to a spatial characteristic of said preselected conductive state.

9. The quench detector of claim 2 wherein said activating source is one of a photonic activating source and an ionizing radiation activating source.

10. The quench detector of claim 1 further comprising:
  a. a plurality of luminescence detectors disposed in a preselected spatial relationship along said quenching sensor; and
  b. a synchronizer operably coupled to selected ones of said plurality of luminescence detectors, said synchronizer determining a temporal relationship between luminescence signals from said selected ones, thereby providing a location of said preselected conductive state in said superconductor.

11. The quench detector of claim 8 further comprising:
  a. a plurality of luminescence detectors disposed in a preselected spatial relationship along respective ones of said plurality of sensor segments; and
  b. a synchronizer operably coupled to selected ones of said plurality of luminescence detectors, said synchronizer determining a temporal relationship between quenching signals from said selected ones, thereby providing a location of said preselected conductive state in said superconductor.

12. The quench detector of claim 2 wherein said quenching signal has a signal spectrum corresponding to said superconductor temperature which temperature corresponds to said preselected conductive state and said luminescence detector further comprises a spectral analyzer operably coupled to said selected ones for determining a characteristic of said preselected conductive state corresponding to said signal spectrum.

13. The quench detector of claim 1 wherein said preselected conductive state includes one of superconductive state and local coil quench state and propagating normal conductive state and growing normal conductive state and global coil quench state.

14. The quench detector of claim 7 wherein said spatial characteristic includes quench propagation velocity and quench size and quench location.

15. The quench detector of claim 1 wherein said quenching sensor is an optical sensor, said optical sensor including said preselected thermoluminescent material therein.

16. The quench detector of claim 15 wherein said optical sensor includes one of an optical fiber and an optical fiber bundle and a light pipe.

17. The quench detector of claim 1 wherein said quenching sensor further comprises:
  a. a portion of said preselected thermoluminescent material in operable thermal contact with said superconductor; and
  b. an optical sensor optically coupled with said portion, said optical sensor for receiving said luminescence signal from said portion and conveying said signal to said luminescence detector.

18. The quench detector of claim 17 wherein said portion is a layer of said preselected thermoluminescent material disposed on at least a portion of said superconductor.

19. The quench detector of claim 17 wherein said portion is a crystal of said preselected thermoluminescent material, said quenching sensor further comprises a receptacle for enclosing said crystal therewithin, and a heater within said receptacle and in contact with said crystal, said heater being in operable electrical contact with said superconductor and heating said crystal responsive to said conductive state, thereby producing said quenching signal, said receptacle permitting said signal to be coupled to said optical detector.

20. The quench detector of claim 17 wherein said quenching sensor further comprises:
  a. a preselected thermoluminescence activation material intermixed with said preselected thermoluminescent material to form a thermoluminescent mixture; and
  b. a receptacle for enclosing said thermoluminescent mixture therewithin, said receptacle being in intimate contact with said superconductor, and permitting said signal to be coupled to said optical detector.

21. The quench detector of claim 17 wherein said optical sensor includes one of an optical fiber and an optical fiber bundle and a light pipe.

22. A method for detecting a conductive state in an energized superconductor, said method comprising the steps of:
  a. detecting a luminescence signal from a thermoluminescent sensor, said sensor being in intimate thermal contact with at least a portion of said energized superconductor, said sensor being responsive to a temperature of said superconductor, said temperature being indicative of a preselected conductive state;
  b. comparing said luminescence signal to a predetermined threshold value, corresponding to said preselected conductive state, to determine the existence of said preselected conductive state; and
  c. responding to said preselected conductive state with a predetermined response.

23. The method of claim 22, further comprising the step of activating said thermoluminescent sensor by irradiating said sensor with a preselected radiation, said sensor being responsive to said radiation.

24. The method of claim 23, further comprising the step of cooling said superconductor to a preselected superconductor operating temperature, said step of cooling generally preceding said step of activating.

* * * * *